United States Patent [19]
Marus et al.

[11] 3,821,699
[45] June 28, 1974

[54] DEPTH SENSOR FOR BOAT TRAILERS

[75] Inventors: Louis J. Marus, Millington; James D. Abernathy, Memphis, both of Tenn.

[73] Assignees: Louis J. Marus, Millington; Irvin Bogatin, Memphis, both of, Tenn.; by said Abernathy, part interest to each

[22] Filed: Nov. 17, 1972

[21] Appl. No.: 307,474

[52] U.S. Cl............. 340/59, 340/244 C, 200/61.04
[51] Int. Cl. .......................................... G08b 21/00
[58] Field of Search.... 340/52 R, 59, 244 R, 244 C; 200/61.04, 61.05, 61.52, 84

[56] References Cited
UNITED STATES PATENTS
3,732,556  5/1973  Caprillo et al. ............. 340/244 C X

OTHER PUBLICATIONS

Daniel Mickle, Popular Electronics, Jan. 1972, Vol. 1, No. 1, page 102.

Primary Examiner—Alvin H. Waring
Attorney, Agent, or Firm—Ralph W. Kalish

[57] ABSTRACT

A depth sensor for boat trailers comprising a signaling device positionable within the interior of a towing vehicle, a source of current connected to said signaling device, a normally open switch between said signaling device and said source of current, and a switch closing circuit including electrodes mounted upon the trailer for current conduction therebetween when immersed in water to thereupon cause said signal to be energized.

4 Claims, 3 Drawing Figures

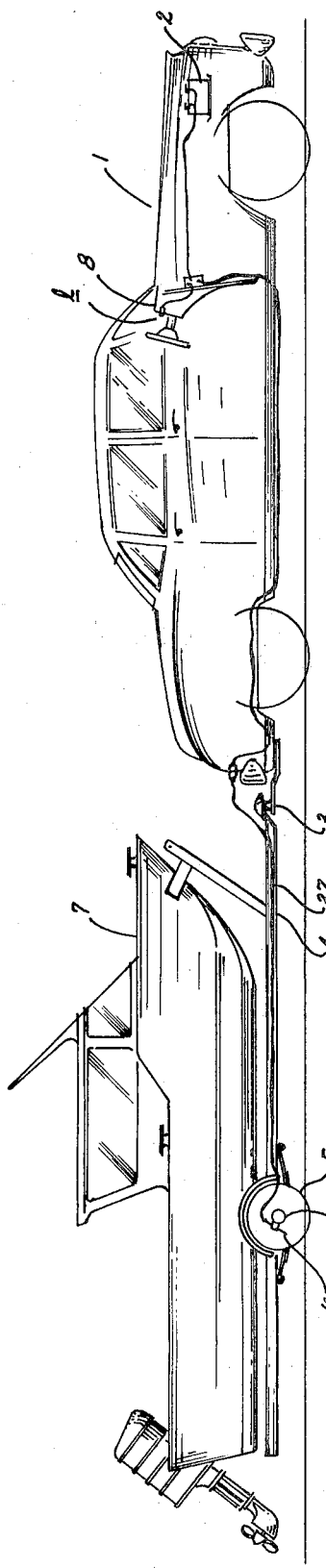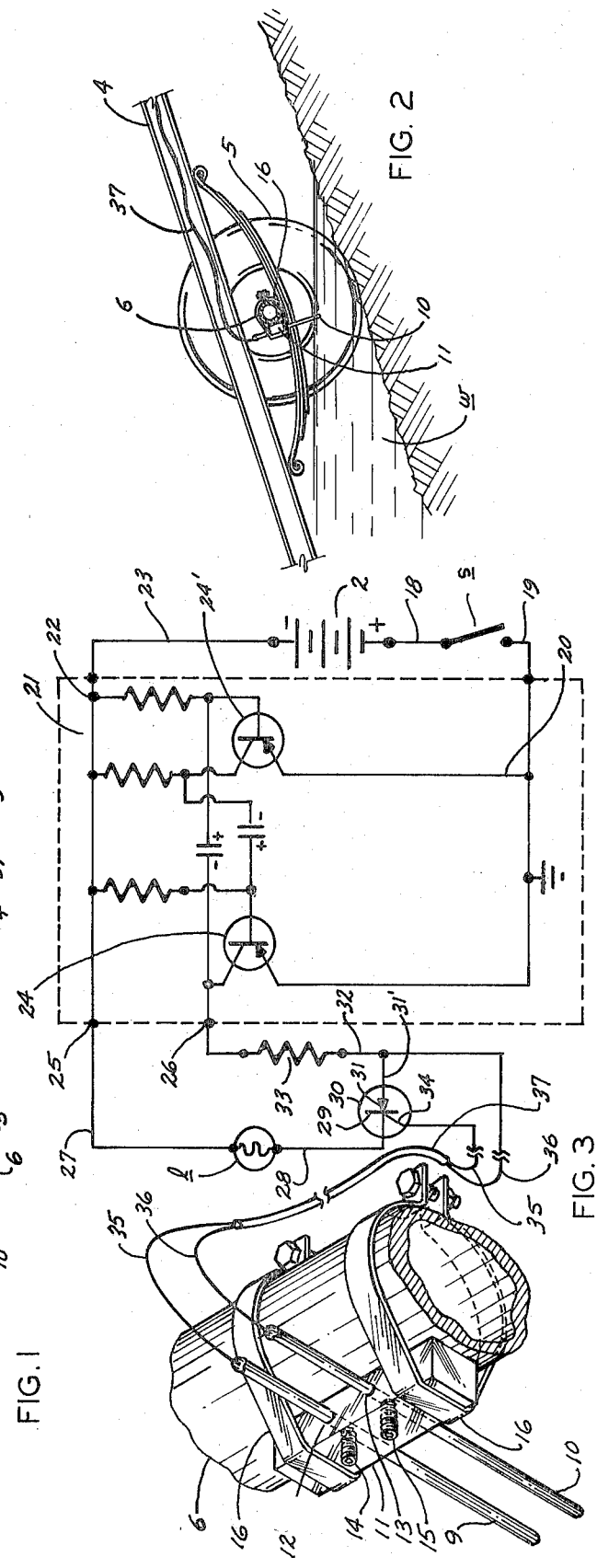
FIG. 1
FIG. 2
FIG. 3

DEPTH SENSOR FOR BOAT TRAILERS

BACKGROUND AND SUMMARY OF THE INVENTION

This invention relates in general to boat trailers and, more particularly, to a system for indicating the attainment of a predetermined boat-launching depth within a body of water.

It is an object of the present invention to provide a depth sensor for use with a boat trailer to indicate to the operator of the towing vehicle when the trailer has been disposed, as through backing, within a body of water at a depth suitable for releasing the boat carried by such trailer.

It is another object of the present invention to provide a depth sensor for use with boat trailers which obviates the utilization of the services of a third party for observing the entry of the trailer in a body of water for alerting the towing vehicle operator when a desirable depth has been reached; as well as eliminating the tedious vigilance exercised by the said operator when alone for determining when to discontinue the prelaunching disposition of the trailer.

It is another object of the present invention to provide a depth sensor of the type stated which is automatic and reliable in operation, permitting the towing vehicle operator to observe merely the energization of a signal conveniently located within the towing vehicle for determining when the trailer is appropriately placed within the body of water.

It is a further object of the present invention to provide a depth sensor of the type stated which may be readily installed upon, and removed, existing trailers, without requiring costly and time consuming mounting and dismounting so that the same constitutes an accessory easily used by the average boat trailer owner.

It is a still further object of the present invention to provide a depth sensor used with boat trailers which is adapted for adjustability in order that launching may be made at a particularly preselected depth.

It is a further object of the present invention to provide a depth sensor of the type stated which may be most economically manufactured; and which is comprised of a marked simplicity of parts to assure of durability in usage and of facility in installation.

BRIEF DESCRIPTION OF THE DRAWINGS

FIG. 1 is a side elevational view of a towing vehicle with an attached trailer having mounted thereon a depth sensor for the trailer constructed in accordance with and embodying the present invention.

FIG. 2 is a side elevational view of the depth sensor as mounted on the axle of the boat trailer and showing the sensor in operative disposition within a body of water.

FIG. 3 is a wiring diagram incorporating a perspective view of the associated electrodes.

DESCRIPTION OF THE PREFERRED EMBODIMENT

Referring now to the drawings which illustrate the preferred embodiment of the present invention, 1 generally designates a conventional towing vehicle, such as, for example, a pleasure automobile, having the customary battery 2, and a trailer hitch 3 for connection to a boat trailer 4, also of conventional design, which latter is supported by a pair of ground-engaging wheels 5, carried by an axle 6, and having the usual bearings (not shown).

In normal practice for launching a boat, as at 7, suitably mounted upon trailer 4, the operator of towing vehicle 1 will back trailer 4 into a body of water, as indicated at w, in FIG. 2, and after trailer 4 has reached a certain depth suitable for launching boat 7 the operator will discontinue the backing operation and then undertake the requisite steps for releasing boat 7.

In the present invention, a suitable signaling device, such as a lamp 1, is mounted interiorly of vehicle 1, preferably upon the dashboard 8 thereof, for readily observed illumination upon attainment of the preselected depth by trailer 4. It is to be recognized that for purposes of description herein, lamp 1 is simply exemplary of a signaling device since it is quite obvious that the same may be readily replaced by other visual indicating means, such as a gage or the like, as well as by an aural device, such as a buzzer, etc., without departing from the character of this invention.

By circuitry to be more fully described hereinbelow, lamp 1 is suitably connected to a pair of axially parallel spaced-apart, electrode-forming rods 9,10, which are carried within a mounting block 11 of suitable dielectric material, such as, for instance, LUCITE, or other preferably durable material. Said mounting block incorporates spaced-apart bores 12,13 for slideably receiving said rods 9,10, respectively, which are maintained in predetermined relationship by means of set screws 14,15, respectively, threadedly disposed within block 11 and having insulated inner ends (not shown). As will be seen in FIGS. 2 and 3, mounting block 11 is suitably secured upon axle 6 by means of any suitable clamps 16 for embracing axle 6 and maintaining mounting block 11 disposed thereagainst. It should be understood that the means of mounting block 11 may be supported upon axle 6 in any convenient manner since the precise means thereof do not form a part of the present invention; with the recognition that resilient expedients may be utilized for permitting shifting of block 11 in response to forces accidentally applied against rods 9,10, during ground travel of trailer 4. With respect to FIG. 3 it will be readily observed that through appropriate adjustment of set screws 14,15, the relative downward extension of rods 9,10 with respect to block 11 may be easily achieved. The adjustment of rods 9,10 is determined by desired launching depth since the relatively greater extension of rods 9,10 downwardly of block 11, the shallower the depth.

Accordingly, as now will be more fully described, when the lower ends of rods 9,10 are immersed in water, lamp 1 will be illuminated.

Turning now to FIG. 3, it will be seen that one side of battery 2, which is preferably of the customary 12 volt type, is connected by a conductor 18 to a control switch s, with the other side of the latter being connected by a lead 19 to one input 20 of a multivibrator 21, the other input 22 of which is connected to the other side of battery 2 by a conductor 23. Multivibrator 21 is of conventional solid state design, being of the astable type, incorporating the customary pair of transistors 24,24', and the usual circuitry. Said multivibrator 21 embodies a pair of output terminals 25,26, the former being connected to one side of lamp 1 by a lead 27. The opposite side of said lamp 1 is connected by means of a conductor 28 to the cathode 29 of a latching switch 30 of the type commonly referred to as a silicon controlled rectifier (SCR). Switch 30 contains an anode 31 which is connected with the other output terminal 26 of multivibrator 21 by leads 31' and 32 within which latter there is disposed a resistor 33. Switch 30 also embodies the customary gate lead 34 which is connected by a lead 35 to the upper end of rod 9. Companion rod 10 is connected at its upper end portion to switch anode 31 by means of a lead 36.

Rods 9,10 are formed preferably of copper but may be of any suitable conductive metal for current conduction upon immersion in water at their lower end portions. Although from the foregoing various manners of assembling the present invention will become obvious, it is apparent that leads 35,36 may be readily provided within a single cable, as indicated at 37 (FIG. 2) carrying a connector (not shown) for engagement to a cooperating member (not shown) conveniently located on the towing vehicle to provide an easy "hook-up" for the system so that the remaining components are located within the towing vehicle 1.

In operation, as the operator commences the backing operation for effecting entry of trailer 4 in water w, switch s is closed so that d.c. voltage is supplied to multivibrator 21 between input terminals 20,22 from battery 2. As it is understood, multivibrator 21 produces alternating voltage between its output terminals 25,26 as of square wave form which is of a controlled frequency dependent upon the selected characteristics of the components of said multivibrator 21 and which is determined by the desired rate of pulsation of lamp 1. Latching switch 30 is normally open so that lamp 1 will remain in a non-energized state until switch 30 is closed and thereby permitting the circuit through lamp 1 to be established.

The closing of switch 30 is effected by the establishment of a triggering current developed by conduction between electrodes 10,9 within the water within which said electrodes are immersed and thence through lead 35 and gate lead 34. With switch 30 thereby closed, current flows through the output terminals 25,26 of multivibrator 21 causing lamp 1 to be pulsatingly illuminated thereby demanding the attention of the operator of vehicle 1 and indicating to him that trailer 4 has reached a depth propitious for launching of boat 7. As long as electrodes 9,10 are immersed, latching switch 30 will remain closed and lamp 1 will continue to pulsate. Upon withdrawl of electrodes 9,10 from the water, circuit between them is then broken and latching switch 30 will return to open condition with extinguishment of lamp 1. Switch 30 will thus remain in such open condition until properly triggered by current through gate lead 34. It is evident that the current provided by immersion of electrodes 9,10 is relatively small and would be insufficient in strength to effect a direct illumination of lamp 1 or energization of any other signaling device. However, such limited current is adequate for triggering latching switch 30 into closed condition and thereby create a path through the anode/cathode thereof for activating lamp 1. It is obvious that due to the alternating character of the current produced by multivibrator 21, lamp 1 will not be illuminated during the interlude when current is flowing from a direction of cathode 29 to anode 31. In such interludes, latching switch 30 will be open or reset to be reclosed upon reversal of direction of the current as long as the triggering circuit is provided through gate lead 34 by virtue of the disposition of the lower ends of electrodes 9,10 within water.

In view of the foregoing, it will be seen that the present invention contains a system which incorporates a triggering circuit and a signal energizing circuit, but which is exceedingly simple and reliable in operation. The triggering circuit does not require any complex components but merely two spaced-apart electrodes which are positionable vertically with respect to axle 6 so as to determine the location of the same relative to the surface of the water before the signal is energized.

Thus, the present invention is uniquely adapted to permit a single individual to readily locate a trailer at the appropriate depth for boat launching without the services of a third party and with doing nothing other than regarding a signal device conveniently located within the towing vehicle.

Although the rods or electrodes 9,10 are illustrated as being mounted by suitable means, such as clamps, upon axle 6 of trailer 4, it is, of course, evident that the same may be mounted at any desired location on said trailer, such as, for instance, at the rearward end of the frame thereof. Although obviously the axle would, conceivably, be the most desirable point of securement.

It is to be recognized that although for purposes of illustration only, rods 9,10 are illustrated as being mounted upon the trailer axle, it must be recognized that the same may be located at any suitable point upon the trailer. The precise location may be dictated by the boat size, as well as the weight, which latter may tend to place an undue stress upon the trailer springs and thus cause the boat to be carried in a relatively lowered position so that it would not be desirable to have a circuit established between rods 9,10 prematurely.

Consequently, the said rods can be adapted for suspension at the forward end of the trailer, as in the vicinity of the bow support for the boat, at the tail end of the trailer, etc. At the risk of repetition, the description of electrodes 9,10 being mounted upon the axle is only for disclosure purposes.

Having described our invention, what we claim and desire to obtain by Letters Patent is:

1. The combination with a trailer having at least one wheel-supporting axle, a towing vehicle to which said trailer is coupled, of a water depth sensor for indicating relative extent of immersion of a trailer in a body of water, said sensor comprising a pair of rigid, spaced-apart, rod-like electrodes, a mounting block constructed of dielectric material carried on said trailer, said electrodes being disposed upon said block in predetermined spaced-apart relationship and with their longitudinal axes substantially normal to the longitudinal axis of the trailer, said electrodes extending downwardly toward the trailer support surface and being spaced therefrom a predetermined distance, a signal device, a voltage source, a signal energizing circuit connecting said voltage source and said signal, a normally open latching switch provided in said signal energizing circuit, a triggering circuit connecting said electrodes and said latching switch whereby when said electrodes extend into water for current establishment said latching switch is closed and said signal device is energized.

2. The combination with a trailer having at least one wheel-supporting axle, a towing vehicle to which said trailer is coupled, of a water depth sensor as defined in claim 1 and further characterized by said mounting block being carried upon said trailer axle, and means provided on said block for vertical adjustment of said electrodes to control the downward extension of the same toward said trailer support surface for affecting the juncture at which said signal device is energized.

3. The combination with a trailer having at least one wheel-supporting axle, a towing vehicle to which said trailer is coupled, of a water depth sensor as defined in claim 2 and further characterized by said signal device being a lamp located within said towing vehicle for informing the operator thereof as to the relative location of the trailer within water without the necessity of direct observation, said voltage source being a battery located within said towing vehicle.

4. The combination with a trailer having at least one wheel-supporting axle, a towing vehicle to which said trailer is coupled, of a water depth sensor as defined in claim 3 and further characterized by a multivibrator connected to said battery, said multivibrator having a pair of output terminals, said signal energizing circuit including leads connecting said output terminals of said multivibrator with said lamp, said normally open latching switch being a silicon controlled rectifier and having a gate lead provided within said triggering circuit.

* * * * *